United States Patent
Ramalingam et al.

(10) Patent No.: US 9,851,905 B1
(45) Date of Patent: Dec. 26, 2017

(54) CONCURRENT MEMORY OPERATIONS FOR READ OPERATION PREEMPTION

(71) Applicant: INTEL CORPORATION, Santa Clara, CA (US)

(72) Inventors: Anand S. Ramalingam, Beaverton, OR (US); Pranav Kalavade, San Jose, CA (US); Aliasgar S. Madraswala, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/280,898

(22) Filed: Sep. 29, 2016

(51) Int. Cl.
*G11C 7/00* (2006.01)
*G06F 3/06* (2006.01)
*G06F 12/0802* (2016.01)

(52) U.S. Cl.
CPC .......... *G06F 3/0611* (2013.01); *G06F 3/0647* (2013.01); *G06F 3/0659* (2013.01); *G06F 3/0685* (2013.01); *G06F 12/0802* (2013.01)

(58) Field of Classification Search
CPC .... G06F 3/0611; G06F 3/0647; G06F 3/0659; G06F 3/0685; G06F 3/0802
See application file for complete search history.

(56) References Cited

U.S. PATENT DOCUMENTS

| 7,213,086 | B2 * | 5/2007 | Wyatt | G06F 1/3203 710/18 |
| 7,522,468 | B2 * | 4/2009 | Norman | G11C 5/02 365/230.03 |

OTHER PUBLICATIONS

Intel Corporation et al., "Open NAND Flash Interface Specification", Open NAND Flash Interface Specification, Revision 4.0, Apr. 2, 2014, 315 pp.

* cited by examiner

*Primary Examiner* — Pho M Luu
(74) *Attorney, Agent, or Firm* — Konrad Raynes Davda & Victor LLP

(57) ABSTRACT

A non-volatile memory interface employs concurrent memory operations for read operation preemption and includes transaction control logic configured to resume a suspended write operation concurrently with at least a portion of the transfer of read data from a non-volatile memory for a read operation which preempted the write operation. Memory control logic of the memory interface is configured to issue to the write operation suspend logic, a write operation resume command. The transaction control logic may be further configured to automatically suspend performing of a write operation in response to receipt of a read command. The transaction control logic may also be configured to automatically resume a previously suspended write operation in response to completion of a preemptive read operation by the memory.

19 Claims, 5 Drawing Sheets

CONCURRENT MEMORY OPERATIONS FOR READ OPERATION PREEMPTION

TECHNICAL FIELD

Certain embodiments of the present description relate generally to management of memory resources.

BACKGROUND

In a memory such as a NAND, non-volatile memory, for example, there are frequently restrictions against performing read and write operations at the same time in a particular memory. However, a read operation may typically be completed much faster than a write operation. Moreover, the results of read operations are frequently needed more quickly than the completion of write operations. Thus, if the system is forced to await the completion of a write operation before proceeding with a read operation, system performance may be adversely affected.

One approach to address this issue has been to pre-empt ongoing write operations to allow a subsequent read operation to proceed. Accordingly, in one known technique, the system issues a suspend command to the memory to cause the memory to suspend an ongoing write operation. After the suspend operation has been completed, the system issues the read operation to the memory. Once the read operation has been completed by the memory, the system transfers the results of the read operation from the memory. After the transfer operation has been completed, the system issues a resume command to the memory, permitting the memory to terminate the suspension and subsequently complete the previously suspended write operation.

BRIEF DESCRIPTION OF THE DRAWINGS

Embodiments of the present disclosure are illustrated by way of example, and not by way of limitation, in the figures of the accompanying drawings in which like reference numerals refer to similar elements.

DESCRIPTION OF EMBODIMENTS

Figure 1:
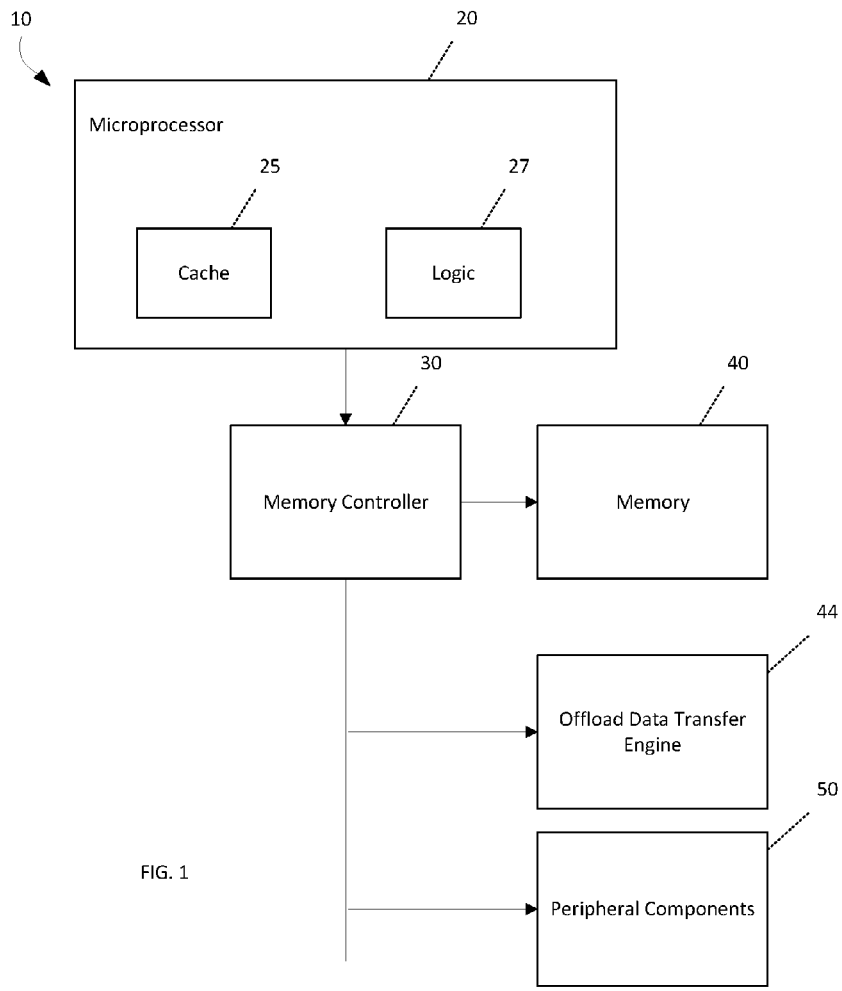
FIG. 1 depicts a high-level block diagram illustrating one embodiment of a system employing concurrent memory operations for read operation preemption in accordance with the present description.

In the description that follows, like components have been given the same reference numerals, regardless of whether they are shown in different embodiments. To illustrate one or more embodiments of the present disclosure in a clear and concise manner, the drawings may not necessarily be to scale and certain features may be shown in somewhat schematic form. Features that are described or illustrated with respect to one embodiment may be used in the same way or in a similar way in one or more other embodiments or in combination with or instead of features of other embodiments.

A memory interface or other logic in accordance with one aspect of the present description employs concurrent memory operations for read operation preemption to reduce the impact upon a read operation and an ongoing write operation due to read operation preemption. Thus, a memory interface in accordance with one aspect of the present description, includes write operation suspend logic configured to resume a suspended write operation concurrently with at least a portion of the transfer of read data from the memory for a read operation which preempted the write operation. In one embodiment memory control logic of the memory interface includes memory command issuance logic which is configured to issue to the write operation suspend logic, a write operation resume command to initiate resumption of a previously suspended write operation command so that data transfer logic of the memory control logic transfers at least a portion of the read data from the memory concurrently with at least a portion of the resumption operations resuming a write operation in response to the write operation resume command issued by the memory control logic. As a result, a write operation may be resumed more quickly following a suspension of that write operation instead of waiting for the transfer of read data to be completed.

In another aspect of the present description, a write operation suspend logic may be further configured to automatically suspend performing of a write operation in response to receipt of a read command by the write operation suspend logic. The write operation suspend logic may also be configured to automatically resume a previously suspended write operation in response to completion of a preemptive read operation by the memory. As a result, a suspend operation followed by the preemptive read operation may both be initiated more quickly in some embodiments. Moreover, a write operation may be resumed more quickly as well. In this manner, delays to an ongoing write operation due to a preemptive read operation, and delays to the preemptive read operation itself, may be reduced, improving system performance.

A memory interface employing concurrent memory operations for read operation preemption in accordance with the present description is described herein in connection with sectors of data, blocks of sectors and regions of blocks. However, it is appreciated that a memory interface in accordance with the present description may be applied to other units and subunits of data such as volumes, tracks, segments, files, bytes, etc.

A memory interface having concurrent memory operations for read operation preemption in accordance with the present description may, in one embodiment, be employed in a system of one or more computers configured to perform particular operations or actions of concurrent memory operations for read operation preemption, by virtue of having software, firmware, hardware, or a combination of them installed on the system that in operation causes or cause the system to perform the actions. One or more computer programs can be configured to perform particular operations or actions of concurrent memory operations for read operation preemption, by virtue of including instructions that, when executed by data processing apparatus, cause the apparatus to perform the actions.

Other embodiments include corresponding computer systems, apparatus, and computer programs recorded on one or more computer storage devices, each configured to perform the actions of the methods. Implementations of the described techniques may include hardware, a method or process, or computer software on a computer-accessible medium.

It is appreciated that concurrent memory operations for read operation preemption in accordance with the present description may be applied to a variety of host, storage and other memory devices such as for example, magnetic and optical disk drives, and solid state memory devices that use chalcogenide phase change material (e.g., chalcogenide glass), three-dimensional (3D) crosspoint memory, or memory that incorporates memristor technology. Additional memory devices which may benefit from a memory interface having concurrent memory operations for read operation preemption in accordance with the present description may include other types of byte-addressable, write-in-place non-volatile memory, ferroelectric transistor random-access memory (FeTRAM), nanowire-based non-volatile memory, Magnetoresistive random-access memory (MRAM), Spin Transfer Torque (STT)-MRAM, Phase Change Memory (PCM), storage class memory (SCM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM)), STRAM (spin tunneling RAM), magnetic memory, magnetic random access memory (MRAM), and Semiconductor-oxide-nitride-oxidesemiconductor (SONOS, also known as dielectric memory). It is appreciated that other types of memory may benefit from a memory interface having concurrent memory operations for read operation preemption in accordance with the present description, depending upon the particular application.

Turning to the figures, FIG. 1 is a high-level block diagram illustrating selected aspects of a computing system implemented according to an embodiment of the present disclosure. System 10 may represent any of a number of electronic or other computing devices, that may include a memory device. Such electronic devices may include a cloud storage system and other computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). System 10 can be powered by a battery, renewable power source (e.g., solar panel), wireless charging, or by use of an AC outlet.

In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, an offload data transfer engine 44, and peripheral components 50 which may include, for example, video controller, input device, output device, storage, network interface or adapter, a power source (including a battery, renewable power source (e.g., photovoltaic panel), wireless charging, or coupling to an AC outlet), etc. The microprocessor 20 includes a cache 25 that may be part of a memory hierarchy to store instructions and data, and the system memory 40 may also be part of the memory hierarchy. The microprocessor 20 further includes logic 27 which may include one or more cores, and may include a system agent, for example. A core typically contains the components of the processor involved in executing instructions, such as an arithmetic logic unit (ALU), floating point unit (FPU), and/or various levels of cache (such as L1 and L2 cache), for example. A system agent may include various controllers such as serial or parallel data path controllers, various levels of cache (such as L3 cache) a snoop agent pipeline an on-die memory controller, and/or other logic. Communication between the microprocessor 20 and the memory 40 may be facilitated by a memory controller (or chipset) 30, which may also facilitate in communicating with the peripheral components 50. The memory controller 30 may be on-die with a component such as a microprocessor 20, an offload engine 44, a memory of the memory 40, or a component of the peripheral components 50, for example, or may be separate.

Peripheral components 50 which are storage devices may be, for example, non-volatile storage, such as solid-state drives (SSD), magnetic disk drives including redundant arrays of independent disks (RAID), optical disk drives, a tape drive, flash memory, etc. The storage may comprise an internal storage device or an attached or network accessible storage. The microprocessor 20 is configured to write data in and read data from the memory 40. Programs in the storage are loaded into the memory and executed by the processor. The offload data transfer engine 44 facilitates memory to memory data transfers which bypass the microprocessor to lessen the load of such transfers on the microprocessor 20. As explained in greater detail below, one embodiment of a memory interface having concurrent memory operations for read operation preemption in accordance with the present description, can reduce delays due to read operation preemption to improve system performance.

A network controller or adapter enables communication with a network, such as an Ethernet, a Fiber Channel Arbitrated Loop, etc. Further, the architecture may, in certain embodiments, include a video controller configured to display information represented by data in a memory on a display monitor, where the video controller may be embodied on a video card or integrated on integrated circuit components mounted on a motherboard or other substrate. An input device is used to provide user input to the processor, and may include a keyboard, mouse, pen-stylus, microphone, touch sensitive display screen, input pins, sockets, or any other activation or input mechanism known in the art. An output device is capable of rendering information transmitted from the processor, or other component, such as a display monitor, printer, storage, output pins, sockets, etc. The network adapter may embodied on a network card, such as a Peripheral Component Interconnect (PCI) card, PCI-express, or some other I/O card, or on integrated circuit components mounted on a motherboard or other substrate. The peripheral devices 50 may also include RF receiver/transmitters such as in a mobile telephone embodiment, for example. Additional examples of peripheral devices 50 which may be provided in the system include an audio device and temperature sensor to deliver temperature updates for storage in the memory.

One or more of the components of the device 10 may be omitted, depending upon the particular application. For example, a network router may lack a video controller, for example.

Any one or more of the memory devices 25, 40, and the other devices 10, 30, 50 may include a memory employing a memory interface having concurrent memory operations for read operation preemption in accordance with the present description, or be embodied as any type of data storage capable of storing data in a persistent manner (even if power is interrupted to non-volatile memory) such as but not limited to any combination of memory devices that use for example, chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or another Spin Transfer Torque (STT)-MRAM as described above. Such memory elements in accordance with embodiments described herein can be used either in stand-alone memory circuits or logic arrays, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Figure 2A:
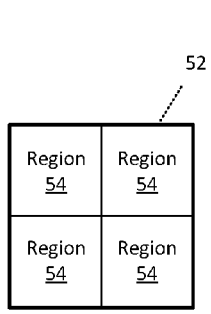
FIGS. 2a-2d depict various hierarchical levels of data storage of the memory of FIG. 1.
Figure 2B:
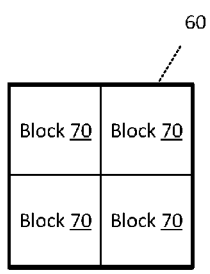

One or more of the memory 40 and storage devices of the peripheral devices 50 may have a rectangular or orthogonal array of rows and columns of cells such as bit cells in which each bit cell is configured to store a bit state. An array of bit cells may be logically subdivided in an array 52 of regions 54 (FIG. 2a). Depending upon the size of the memory, the array of bit cells may have a single region or tens, hundreds, thousands, or more of such regions 54. A region 54 may be logically subdivided in an array 60 of blocks 70 (FIG. 2b). Depending upon the size of the memory, the array of blocks may have a single block or tens, hundreds, thousands, or more of such blocks 70. In one embodiment, the memory 40 or storage device of the devices 50 may include a non-volatile memory such as a flash memory, for example, in which each block 70 represents the smallest subunit of the memory which may be erased at one time.

Figure 2C:
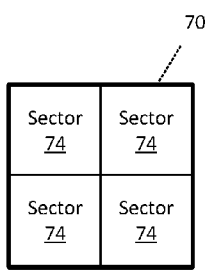
Figure 2D:
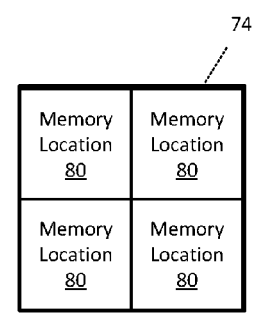

Each block 70 may in turn be subdivided into an array of sectors 74 (FIG. 2c). Depending upon the size of the memory, a block 70 of sectors 74 may have a single sector or tens, hundreds, thousands, or more of such sectors 74. Each sector 74 may in turn be subdivided into an array of memory locations 80 (FIG. 2d). Depending upon the size of the memory, a sector 74 of memory locations 80 may have a single memory location or tens, hundreds, thousands, or more of such memory locations 80. One specific example of a sector is sized sufficiently to store 512 bytes of data. Each memory location includes one or more bit cells to store a bit, a byte, a word or other subunit of data, depending upon the particular application. Although a memory interface in accordance with the present description is described in connection with storing data in a block of one or more sectors, it is appreciated that other units of data storage such as pages, tracks, segments, files, volumes, disks, drives, bytes, etc., may be utilized, depending upon the particular application.

Figure 3:
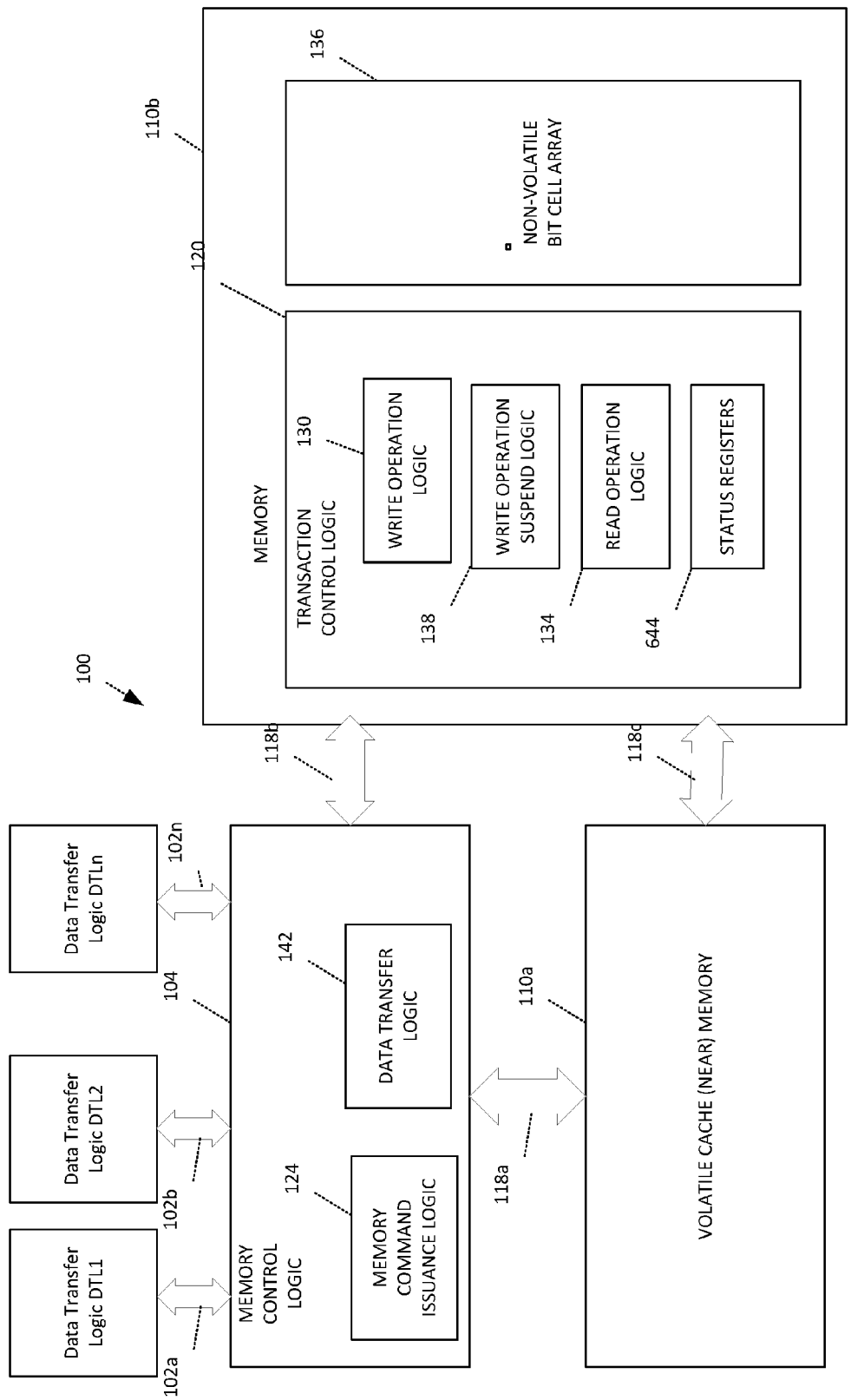
FIG. 3 depicts an embodiment of a memory interface employing concurrent memory operations for read operation preemption in accordance with the present description.

FIG. 3 is a high-level block diagram illustrating selected aspects of another embodiment of a computing system implementing a memory interface 100 in accordance with the present description. In this embodiment, the computing system includes a plurality of data transfer logic elements, DTL1, DTL2, . . . DTLn, each of which may include a local or remote central processing unit, an offload data transfer engine, or other data transfer logic. Each data transfer logic such as the data transfer logic DTL1, for example, is configured to generate and transmit over an appropriate parallel or serial bus or other data path 102a, 102b, . . . 102n, to memory control logic 104 of the interface 100, a memory transaction request such as a read command or a write command, and an address such as a system memory address at which the memory transaction is to take place.

The memory interface 100 provides an interface between the plurality of data transfer logic elements, DTL1, DTL2, . . . DTLn, and one or more memories such as a near memory 110a, and a far memory 110b, in this embodiment. Accordingly, the memory control logic 104 is configured to transmit in response to a memory transaction request and a system address from a data transfer logic elements, DTL1, DTL2, . . . DTLn, a memory transaction request such as a read command or a write command to a memory 110a, 110b, together with the memory address of the appropriate memory 110a, 110b. In one embodiment, the memory 110a may be a non-volatile NAND memory, for example, and the memory 110b may be a non-volatile memory such as the three dimensional (3D) three level cell (TLC) NAND, for example. It is appreciated that other types of memory including volatile memory may be utilized, depending upon the particular application. The memory transfer interface 100 may be located in whole or in part on one or more of a memory die, a central processing unit die, a controller die such as a memory controller die or direct memory access engine die, or other die or dies of the system.

In a TLC NAND, a write operation can take on the order of 100 times longer to complete than a read operation. Thus, a write operation may take 5000 microseconds, for example to complete as compared to 50 microseconds for a read operation to complete. Accordingly, to quickly obtain needed read data, a write operation may be preempted by a read operation before the write operation is completed. The write operation resumes subsequent to the read operation. In one aspect of the present description, the resumption of the write operation may occur concurrently with the transfer of read data from the memory following completion of the read operation by the memory.

The memory control logic 104 is coupled to the near memory 110a by an appropriate parallel or serial bus or other data path 118a. Similarly, memory control logic 104 is coupled to the near memory 110b by an appropriate parallel or serial bus or other data path 118b. For example, the data path 118b may be a bus in which memory transaction requests, memory addresses, error messages and other data are transmitted in accordance with a suitable protocol such as that of the Open NAND Flash Interface (ONFI) specification (http://www.onfi.org), revised as appropriate to accommodate concurrent memory operations for read operation preemption in accordance with the present description. A data path 118c may facilitate direct memory to memory data transfers between the memory 110a and the memory 110b.

As previously mentioned, the memory interface 100 provides an interface between the plurality of data transfer logic elements, DTL1, DTL2, . . . DTLn, and one or more memories such as the near memory 110a, and the far memory 110b, in this embodiment. The memory control logic 104 of the memory interface 100 may be configured to translate memory transaction requests and addresses from the protocols of the data transfer logic elements, DTL1, DTL2, . . . DTLn and their associated data paths 102a, 102b, . . . 102n, respectively, to suitable memory transaction requests and addresses for the near memory 110a, and far memory 110b and their associated data paths 118a, 118b, 118c, as appropriate. It is appreciated that the hardware aspects and transmission protocols of the data paths 102a, 102b, . . . 102n, 118a, 118b, 118c may vary, depending upon the particular application.

In one embodiment, the memory control logic 104 may be implemented in one or more memory controllers. For example, the memory control logic 104 may include a memory controller for the near memory 110a and another memory controller for the far memory 110b. The memory controller or controllers of the memory control logic 104 may be implemented as separate devices or integrated with central processing units, offload data transfer engines, memory devices, etc.

In one embodiment, the memory interface 100 includes transaction control logic 120 of the memory 110b, which receives memory transaction commands issued by a memory command issuance logic 124 of the memory control logic 104, and executes the memory transaction commands which may include read commands and write commands, for example. Accordingly, the transaction control logic 120 of the memory 110b includes write operation logic 130 configured to receive a write command and to perform a write operation in response to a received write command, and read operation logic 134 configured to receive a read command and to perform a read operation in response to a received read command.

The memory 110b of the computing system further includes one or more bit cell arrays 136 which may include a non-volatile memory. The transaction control logic 120 is configured to control input/output operations for the bit cell array 110. For example, the mode control logic 120 is configured to store in a memory region of the bit cell array 136, a plurality of units of data, such as blocks of sectors of data or other subunits of data. It is appreciated that a system in accordance with the present description, may utilize other units and subunits of data and other computer architectures, depending upon the particular application.

In one embodiment, the memory command issuance logic 124 is configured to issue write operation suspend commands and write operations resume commands to a write operation suspend logic 138 of the transaction control logic 120. The write operation suspend logic 138 of the transaction control logic 120 of the memory 110b, is configured to receive a command such as a write operation suspend command, for example, and to cause the write operation logic 130 to suspend a write operation in response to the command received by the write operation suspend logic 138.

The memory command issuance logic 124 is further configured in one embodiment, to issue to the read operation logic 134 upon completion of the write operation suspension operations, a read command in association with issuance of a write operation suspend command. In this manner, the read command preceded by a write operation suspend command, preempts the write operation suspended by the write operation suspend command.

The memory control logic 104 further includes data transfer logic 142 configured to in response to completion of a read operation, transfer read data of a completed read operation from a memory such as the memory 110b. In one aspect of the present description, the memory command issuance logic 124 is also configured to issue a write operation resume command to the write operation suspend logic 138 to initiate resumption of a previously suspended write operation upon completion of the read operation. In this manner, the memory command issuance logic is configured in one embodiment, to issue to the write operation suspend logic a write operation resume command concurrently with data transfer operations of the data transfer logic 142. Similarly, the data transfer logic 142 is configured to transfer read data of a completed read operation from the memory 110b concurrently with the issuance of a write operation resume command to the write operation suspend logic 138.

The write operation suspend logic 138 may, in one embodiment, be configured to receive a command such as a write operation resume command, for example, and to cause the write operation logic 130 to resume a write operation in response to the command received by the write operation suspend logic 138. Thus, the write operation suspend logic 138 is further configured to cause the write operation logic 130 to resume a suspended write operation concurrently with at least a portion of the transfer of read data from the memory. In this manner, at least a portion of the write operation resumption operations may overlap with at least a portion of the data transfer operations. As a result, a write operation may be resumed more quickly following a suspension of that write operation instead of waiting for the transfer of read data to be completed for a read operation which preempted the write operation. Accordingly, system performance may be improved.

In another embodiment, the command received by the write operation suspend logic may be instead of a write operation suspend command, a read command, wherein the write operation suspend logic 138 is configured to automatically cause the write operation logic 130 to suspend the performing of a write operation in response to receipt of a read command by the write operation suspend logic 138. By automatically suspending performance of a write operation by the write operation logic 130 in response to receipt of a read command, delays due a controller issuing a write operation suspend command, and a controller waiting for the suspension operation to complete before sending a read command, may be reduced or eliminated.

In one embodiment, in which a memory performs only one command at a time, the write operation suspend logic 138 is configured to hold the received read command in abeyance until the suspension operations triggered by the read command are complete. Upon completion of the suspension operations, the write operation suspend logic 138 is configured to forward the read command to the read operation logic 134 for execution of the read command.

In another aspect, the write operation suspend logic 138 may be further configured to automatically resume a previously suspended write operation in response to completion of a read operation by the read operation logic 134. In one embodiment, the data transfer logic 142 may be further configured to, in response to completion of a read operation, to transfer read data of the completed read operation from the memory, so that at least a portion of the read data from the memory is transferred concurrently with at least a portion of the resumption operations resuming a write operation in response to completion of a read operation. By automatically resuming performance of a write operation by the write operation logic 130 in response to completion of the preemptive read command, delays due a controller completing a data transfer for the preemptive read operation and subsequently issuing a write operation resume command, may be reduced or eliminated. In this embodiment as well, at least a portion of the write operation resumption operations may overlap with at least a portion of the data transfer operations by the data transfer logic 142. As a result, a write operation may be resumed more quickly following a suspension of that write operation instead of waiting for the transfer of read data to be completed for a read operation which preempted the write operation and instead of waiting for a resume write operation command. Accordingly, system performance may be improved.

In one embodiment, the transaction control logic 120 may be implemented in one or more memory controllers located within a memory device or other components. In another embodiment, the transaction control logic 120 may be integrated in a central processing unit or a direct memory access (DMA) controller or engine, for example.

Figure 4:
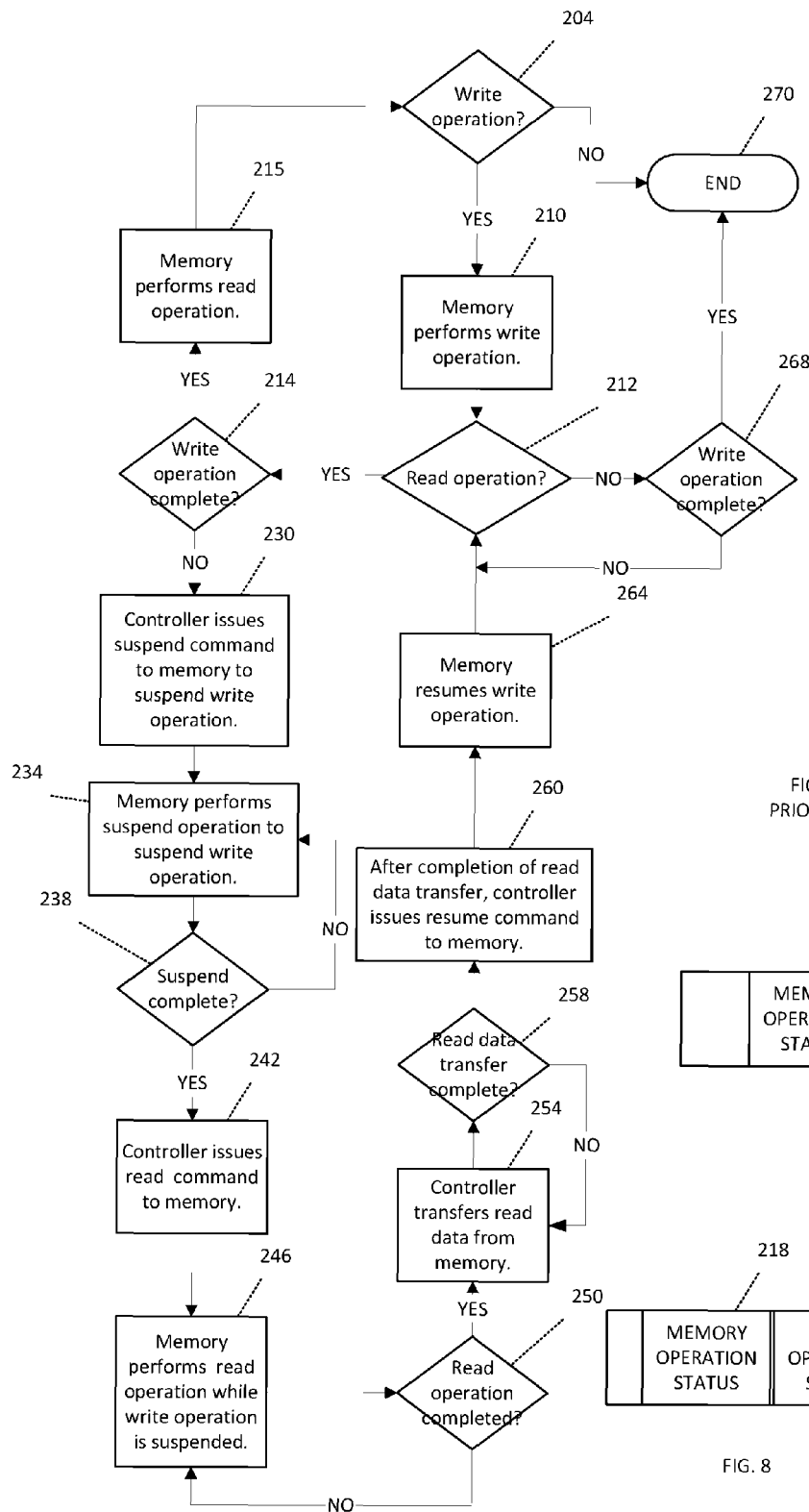
FIG. 4 depicts an example of prior art suspend and resume operations applied to an ongoing write operation to permit a read operation to proceed during the period of suspension of the write operation.

FIG. 4 depicts an example of prior art operations for preempting a write operation with a read operation. A controller receives (block 204) a write operation from a data transfer logic such as a central processing unit, for example, and issues a write command to the memory which initiates execution (block 210) of a write operation in the memory. In this example, the controller subsequently receives (block 212) a read operation before the write operation is completed, that is, while the write operation is being executed.

Figure 5:
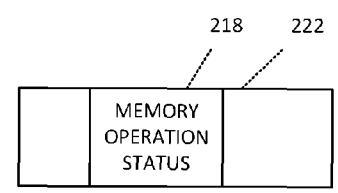
FIG. 5 depicts an example of a prior art status register for a memory.

The controller determines (block 214) whether the write operation has completed, typically by monitoring a memory operation status bit 218 (FIG. 5) of a status register 222 of the memory. The memory operation status bit 218 when read, indicates to the controller whether the memory is busy executing an operation, or whether the operation has been completed or is otherwise idle.

If it is determined (block 214) that the write operation has completed, the controller issues the read operation to memory which performs (block 215) the read operation. Conversely, if it is determined (block 214) that the write operation has not completed, the controller issues (block 230) a suspend command to memory to suspend the write operation. In response, the memory initiates (block 234) a suspend operation to suspend execution of the write operation.

It frequently takes a variable amount of time for the suspend operation to be completed. Thus in many memories, a suspend operation may occupy an interval of time within a range of 50 microseconds to 1000 microseconds, for example, in order to complete the suspension of the write operation.

The controller determines (block 238) whether the suspend operation has completed, typically by reading the memory operation status bit 218 (FIG. 5) of the status register 222 of the memory. If it is determined (block 238) that the suspend operation has not completed, the controller waits for the memory to complete (block 234) the suspend operation. Conversely, if it is determined (block 238) that the suspend operation has completed, the controller issues (block 242) the read command to memory to initiate a read operation. In response, the memory initiates (block 246) the read operation.

In many systems, a controller communicates with a number of NAND dies through a single channel such as 8-32 dies per channel for some systems employing solid state drives. Thus, monitoring of the status of the NAND undergoing the suspension operation is frequently interrupted for relatively long periods of time as the controller attends to other NAND dies. As a result, the NAND die performing the suspend operation may experience significant idle time from the moment the suspend operation is completed until the controller returns to that die, detects that the suspend operation has been completed and issues the read operation.

In prior standards and protocols for such memories, a resume operation to resume the write operation does not occur until the read data transfer has been completed. Accordingly, the controller determines (block 250) whether the read operation has completed, again by reading the memory operation status bit 218 (FIG. 5) of the status register 222 of the memory. If it is determined (block 250) that the read operation has not completed, the controller waits for the memory to complete (block 246) the read operation. Conversely, if it is determined (block 250) that the read operation has completed, the controller transfers (block 254) the read data now available from the memory. The controller determines (block 258) whether the transfer operation has completed.

If it is determined (block 258) that the read data transfer operation has not completed, the controller continues (block 254) the read data transfer operation. Conversely, if it is determined (block 258) that the read data transfer operation has completed, the controller issues (block 260) a write operation resume command to memory to initiate resumption of the write operation. In response, the memory initiates (block 264) resumption of the write operation.

If the controller receives (block 212) another read operation before the resumed write operation is completed (block 214), the suspension and preemption process repeats at block 230. Conversely, if no further read operation is received (block 212) before the write operation completes (block 268), the process ends (block 270).

It is appreciated herein the prior art process depicted in FIG. 4 can substantially delay resumption of a write operation if preempted by a read operation. Thus, a read operation preempting an ongoing write operation in accordance with FIG. 4 may have a significant adverse impact upon system performance.

For example, with increasing page size as well as increased planes with denser lithography, the data transfer phase often takes place over an interval of hundreds of microseconds before the data transfer is complete. Both the delay following completion of the suspend operation before the read operation is issued, and the delay waiting for the read operation to complete before resuming the write operation can add a significant amount of time for completion of the write, such as more than 200 microseconds in some embodiments. As a result, in some prior systems, there may be as much as a 20% degradation in write operation bandwidth. In other prior systems in which a channel services a large number of NAND dies, the degradation may be worse.

Figure 6:
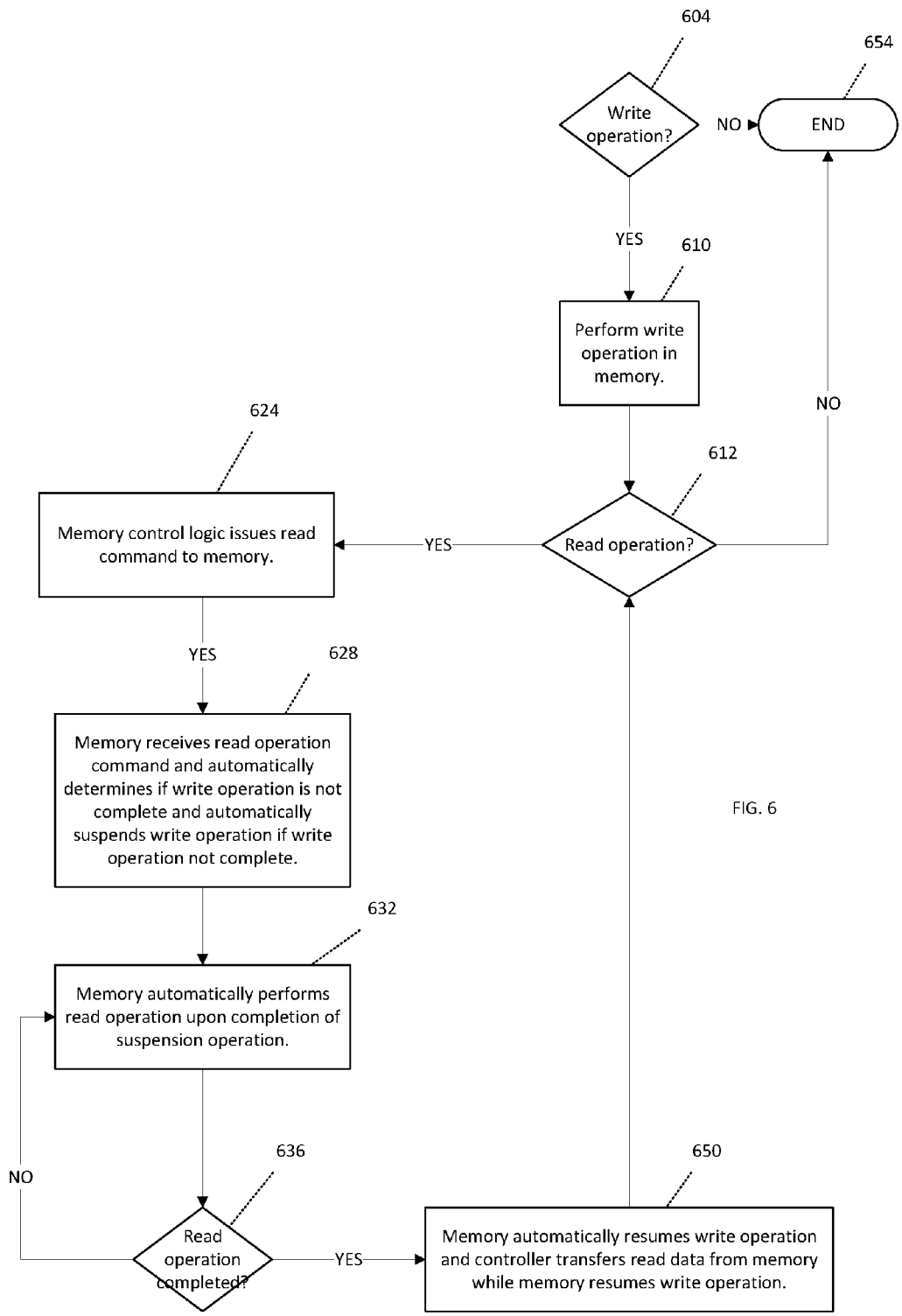
FIG. 6 depicts an embodiment of operations of a memory interface in a system employing concurrent memory operations for read operation preemption in accordance with the present description.
Figure 7:
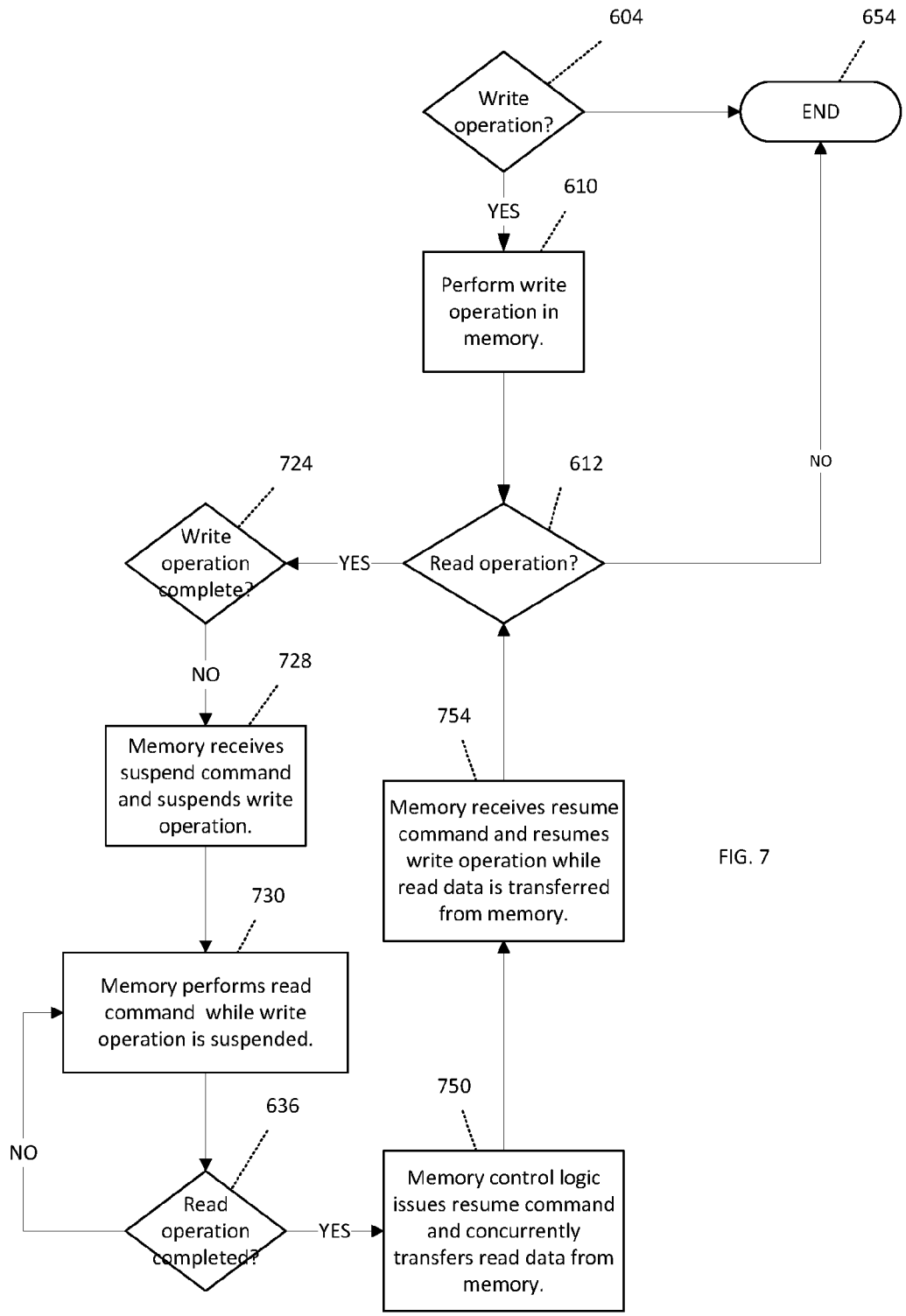
FIG. 7 depicts another embodiment of operations of a memory interface in a system employing concurrent memory operations for read operation preemption in accordance with the present description.

In contrast to the prior art operations of FIG. 4, FIGS. 6 and 7 provide examples of operations of a memory interface employing concurrent memory operations for read operation preemption in accordance with the present description. As explained below, such concurrent operations can significantly reduce delays due to read operation preemption, and thereby significantly improve write operation bandwidth.

In the embodiments of FIGS. 6, 7 the memory control logic 104 of the memory transfer interface 100 receives (block 604, FIGS. 6, 7) a write operation from a data transfer logic such as a central processing unit, for example, and issues a write command to the memory 110b which initiates execution (block 610) of a write operation in the memory. In these examples, the memory control logic 104 subsequently receives (block 612) a read operation before the write operation is completed, that is, while the write operation is being executed.

In some applications, a controller such as the memory control logic 104 may be monitoring and controlling a relatively large number of memory devices such as the memory 110b through a single channel. Hence, in the known system of FIG. 4, there may be a delay before the controller can determine (block 214, FIG. 4) whether the write operation has completed and then issue a suspend command to the memory. FIG. 6 is directed to an embodiment in which the memory command issuance logic 124 of the memory control logic 104 directly issues (block 624, FIG. 6) a read command to the memory 110b, instead of determining whether the write operation has completed and then issuing a suspend command to the memory as described in connection with the existing system of FIG. 4. As a result, a delay in issuing the read operation due to the memory control logic 104 monitoring the status of the write operation prior to issuing a suspend command, may be reduced or eliminated.

Furthermore, in the embodiment of FIG. 6, the write operation suspend logic 130 (FIG. 3) of the transaction control logic 120 of the memory 110b, in response to the read command from the memory control logic 104, is configured to automatically determine (block 628, FIG. 6) whether the write operation has completed and if not, automatically suspends execution of the write operation. As a result, a delay to initiating the suspend operation due to the memory control logic 104 monitoring the status of the write operation prior to issuing a suspend command, may be reduced or eliminated.

As noted above, it frequently takes a variable amount of time for the suspend operation to be completed. Thus in many memories, a suspend operation may occupy an interval of time within a range of 50 microseconds to 1000 microseconds, for example, in order to complete the suspension of the write operation.

Because the controller is frequently monitoring multiple memory devices through a single channel, monitoring the suspend status of the NAND undergoing the suspension operation is frequently interrupted for relatively long periods of time as the memory control logic 104 (FIG. 3) attends to other NAND dies. Hence, in the known system of FIG. 4, there may be a delay before the controller can determine (block 238, FIG. 4) whether the suspend operation has completed and then issue (block 242) a read command to the memory. As a result, in the prior system of FIG. 4, the issuance of the read command may be delayed while the controller monitors other NAND devices before returning to the NAND having the write operation undergoing the suspension operation and determining whether the suspension operation has been completed.

Moreover, the NAND die performing the suspend operation may experience significant idle time from the moment the suspend operation is completed until the memory control logic 104 (FIG. 3) returns to that die, detects that the suspend operation has been completed and issues the read operation to the NAND die. In contrast, in the embodiment of FIG. 6, in which the write operation suspend logic 138 (FIG. 3) of the transaction control logic 120 of the memory 110b automatically suspends (block 628) execution of the write operation in response to a received read operation, a delay in initiating the read operation due to a controller monitoring the status of the suspend operation prior to issuing a read command, may be reduced or eliminated.

Furthermore, in the embodiment of FIG. 6, the memory 110b automatically initiates (block 632) the read operation upon completion of the suspension operation. Thus, any need for the memory control logic 104 to initiate the suspension of the write operation and to monitor the completion of the suspend operation before sending a read operation may be obviated. Accordingly, delays associated with the memory control logic 104 initiating the suspension of the write operation and monitoring the completion of the suspend operation may be obviated as well.

Figure 8:
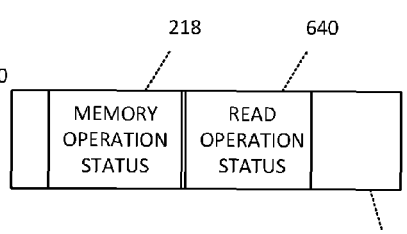
FIG. 8 depicts an embodiment of a status register for a memory interface employing concurrent memory operations for read operation preemption in accordance with the present description.

The memory 110b performs (block 632) the read operation while the write operation is suspended. Further, the memory control logic 104 (FIG. 3) determines (block 636) whether the read operation was completed by the memory. In one embodiment, the memory control logic 104 (FIG. 3) determines (block 636) whether the read operation was completed by the memory by reading a read operation status bit 640 (FIG. 8) of a status register 644 of the memory. The write operation suspend logic 138 is configured to have the status bit 640 indicate completion of a read operation while a resumed write operation is ongoing. It is appreciated that a determination of whether the read operation was completed by the memory may be made using other techniques, depending upon the particular application.

If it is determined (block 636) that the read operation has not completed, the memory control logic 104 (FIG. 3) waits for the memory to complete (block 632) the read operation. Conversely, if it is determined (block 636) that the read operation has completed, the memory control logic 104 (FIG. 3) transfers (block 650) the read data now available from the memory, to a destination requested by the data transfer logic.

In the known system of FIG. 4, a resume operation to resume the write operation did not occur until the read data transfer had been completed and the controller issued a resume command to the memory. In contrast, in the embodiment of FIG. 6, the write operation suspend logic 138 (FIG. 3) of the transaction control logic 120 of the memory 110b automatically resumes the write operation upon completion of the read operation by the memory. The write operation suspend logic 138 (FIG. 3) of the transaction control logic 120 of the memory 110b does not wait for the data transfer operation to complete and does not wait to receive a resume command from the memory control logic 104. Thus, the write operation suspend logic 138 (FIG. 3) resumes the write operation concurrently with at least a portion of the transfer of the read data by the memory control logic 104 (FIG. 3). Conversely, the memory control logic 104 (FIG. 3) transfers read data from the memory concurrently with at least a portion of the resume operation to resume the write operation. As a result, delays to resuming a previously suspended write operation due to waiting for the transfer of read data to be completed and waiting for a resume command from a controller, may be reduced or eliminated.

In the event the memory control logic 104 subsequently receives (block 612) another read operation before the write operation is completed, the process repeats at block 624. Otherwise, the process ends (block 654).

FIG. 7 is directed to another embodiment of operations of a memory transfer interface employing concurrent memory operations for read operation preemption in accordance with the present description. In a manner similar to that of the embodiment of FIG. 6, the memory control logic 104 of the memory transfer interface 100 receives (block 604, FIGS. 6, 7) a write operation from a data transfer logic such as a central processing unit, for example, and the memory command issuance logic 124 issues a write command to the memory 110b which initiates execution (block 610) of a write operation in the memory. In these examples, the memory control logic 104 subsequently receives (block 612) a read operation before the write operation is completed, that is, while the write operation is being executed. In response to the read operation from the data transfer logic, the memory control logic 104 determines (block 724) in this embodiment whether the write operation has completed by monitoring a memory operation status bit of a status register of the memory, such as the status bit 218 (FIG. 5) of a status register 222, or a status bit 218 (FIG. 8) of a status register 644. It is appreciated that the memory control logic 104 may determine (block 624) whether the write operation has completed using a variety of techniques, depending upon the particular application.

If it is determined (block 724) that the write operation has completed, the memory command issuance logic 124 of the memory control logic 104 (FIG. 3), in the embodiment of FIG. 7, issues a suspend command to memory 110b to suspend the write operation. In response to the suspend command, the write operation suspend logic 138 (FIG. 3) of the transaction control logic 120 of the memory 110b, in this embodiment initiates (block 728) a suspend operation to suspend execution of the write operation.

The memory control logic 104 in this embodiment determines whether the suspend operation has completed. In one embodiment, the memory control logic 104 determines whether the suspend operation has completed by monitoring a memory operation status bit of a status register of the memory, such as the status bit 218 (FIG. 5) of a status register 222, or a status bit 218 (FIG. 8) of a status register 644. It is appreciated that the memory control logic 104 may determine whether the suspend operation has completed using a variety of techniques, depending upon the particular application.

Upon completion of the suspend operation, the memory command issuance logic 124 of the memory control logic 104 issues (block 730) the read command to memory to initiate a read operation. In response to the received read command, the memory initiates (block 730) the read operation while the write operation is suspended.

The memory control logic 104 determines whether the read operation has completed. In one embodiment, the memory control logic 104 determines whether the read operation has completed by monitoring a memory operation status bit of a status register of the memory, such as the status bit 218 (FIG. 5) of a status register 222, or a status bit 218 or status bit 640 (FIG. 8) of a status register 644. It is appreciated that the memory control logic 104 may determine whether the read operation has completed using a variety of techniques, depending upon the particular application.

Once the read operation by the memory is completed (block 636, FIG. 7), the memory command issuance logic 124 of the memory control logic 104 issues (block 750) a resume command to the memory 110b, and concurrently transfers read data from the memory. In response to the resume command received by the memory, the memory resumes (block 754) the write operation while read data is transferred from the memory.

In the embodiment of FIG. 7, the write operation suspend logic 138 (FIG. 3) of the transaction control logic 120 of the memory 110b resumes the write operation in response to receipt of the resume command from the memory control logic 104. Thus, the write operation suspend logic 138 (FIG. 3) of the transaction control logic 120 of the memory 110b does not wait for the data transfer operation to complete.

Thus, the write operation suspend logic 138 (FIG. 3) resumes the write operation concurrently with at least a portion of the transfer of the read data by the memory control logic 104 (FIG. 3). Conversely, the memory control logic 104 (FIG. 3) transfers read data from the memory concurrently with at least a portion of the resume operation to resume the write operation. As a result, delays to resuming a previously suspended write operation due to waiting for the transfer of read data to be completed, may be reduced or eliminated. In the event the memory control logic 104 subsequently receives (block 612) another read operation before the write operation is completed, the process repeats at block 724. Otherwise, the process ends (block 654).

It is appreciated that the operations depicted in the figures may be performed by memory interface logic having concurrent memory operations for read operation preemption utilizing architectures other than that depicted in the figures and employing other types of logic components. The logic components discussed herein including the logic elements depicted in figures may be configured to perform the described operations using appropriate hardware, software or firmware, or various combinations thereof. The software may be in the form of firmware, programs, drivers and other instruction sets, and the hardware may be in the form of general purpose logic devices such as microprocessors or specific purpose logic devices such as a memory controller, DMA controller or engine or ASIC device, for example.

The hardware, software or firmware for devices employing concurrent memory operations for read operation preemption in accordance with the present description, may be physically or logically located in any component of the system including the memory itself, a controller such as a memory controller, DMA controller, a microprocessor, etc. Thus, in one embodiment, one or more of the memory interface logic elements depicted in the figures, may be implemented with one or more of hardware of a memory controller, firmware for a memory controller, and software such as associated driver software of a memory controller. In another embodiment, one or more of the memory interface logic elements depicted in the figures may be implemented with one or more of controller hardware such as the central processing unit, for example, or other controller, firmware for the controller hardware and software for the controller hardware such as programs and drivers executed by the controller hardware such as a central processing unit for example. In another embodiment, one or more of the memory interface logic elements depicted in the figures may be implemented with hardware, firmware or software for both an offload data transfer engine and a central processing unit, for example.

It is appreciated that a devices employing concurrent memory operations for read operation preemption in accordance with the present description can, depending upon the particular application, reduce delays in write operation execution due to preemption of the write operation by a read operation. Other aspects may be achieved, depending upon the particular application.

EXAMPLES

The following examples pertain to further embodiments.

Example 1 is an apparatus for a non-volatile memory, comprising: a non-volatile memory interface including: write operation logic configured to receive a write command and to perform a write operation in response to a received write command, write operation suspend logic configured to receive a command, and to suspend a write operation in response to the command received by the write operation suspend logic, read operation logic configured to receive a read command and to perform a read operation in response to a received read command, and data transfer logic configured to transfer read data of the read operation from the memory, wherein the write operation suspend logic is further configured to resume a suspended write operation concurrently with at least a portion of the transfer of read data from the memory.

In Example 2, the subject matter of Examples 1-7 (excluding the present Example) can optionally include wherein the non-volatile memory interface includes a controller having memory command issuance logic configured to issue a write operation suspend command to the write operation suspend logic of the non-volatile memory interface and wherein the command received by the write operation suspend logic is the write operation suspend command to cause the write operation suspend logic to suspend a write operation in response to the write operation suspend command received by the write operation suspend logic.

In Example 3, the subject matter of Examples 1-7 (excluding the present Example) can optionally include wherein the memory command issuance logic is further configured to issue to the read operation logic a read command in association with issuance of a write operation suspend command.

In Example 4, the subject matter of Examples 1-7 (excluding the present Example) can optionally include wherein the controller includes the data transfer logic which is further configured to, in response to completion of a read operation, to transfer read data of the completed read operation from the memory, and wherein the memory command issuance logic is further configured to issue to the write operation suspend logic a write operation resume command to initiate resumption of a previously suspended write operation command so that the data transfer logic is configured to transfer at least a portion of the read data from the memory concurrently with resumption of a write operation in response to the write operation resume command issued by the memory command issuance logic.

In Example 5, the subject matter of Examples 1-7 (excluding the present Example) can optionally include wherein the command received by the write operation suspend logic is a read command, wherein the write operation suspend logic is configured to automatically suspend performing of a write operation in response to receipt of a read command by the write operation suspend logic.

In Example 6, the subject matter of Examples 1-7 (excluding the present Example) can optionally include wherein the non-volatile memory interface includes a controller having memory command issuance logic configured to issue a read command, wherein the write operation suspend logic is further configured to automatically resume a previously suspended write operation in response to completion of a read operation by the read operation logic, and wherein the controller includes the data transfer logic which is further configured to, in response to completion of a read operation, to transfer read data of the completed read operation from the memory, so that the data transfer logic is configured to transfer at least a portion of the read data from the memory concurrently with resumption of a write operation in response to completion of a read operation.

In Example 7, the subject matter of Examples 1-7 (excluding the present Example) can optionally include a computing system comprising: said non-volatile memory interface,
a processor is configured to generate and transmit to the non-volatile memory interface, a memory transaction request and a system address at which the memory transaction is to take place, and any of: a display communicatively coupled to the processor, a network interface communicatively coupled to the processor, or a battery coupled to provide power to the system.

Example 8 is a method, comprising: performing by a memory transaction control logic, a write operation in a non-volatile memory in response to a write command received by the memory transaction control logic, receiving by the memory transaction control logic, a command while performing the write operation, in response to the received command, suspending by the memory transaction control logic, the performing of the write operation, performing by the memory transaction control logic, a read operation while the write operation is suspended, transferring by a controller, read data of the read operation from the memory, and concurrently with at least a portion of the read data transferring from the memory, resuming by the memory transaction control logic, the performing of the write operation.

In Example 9, the subject matter of Examples 8-14 (excluding the present Example) can optionally include a controller issuing a write operation suspend command to the memory transaction control logic wherein the command received by the memory transaction control logic while performing the write operation is the write operation suspend command issued by the controller so that in response to the received write operation suspend command, the memory transaction control logic suspends the performing of the write operation.

In Example 10, the subject matter of Examples 8-14 (excluding the present Example) can optionally include the controller issuing to the memory transaction control logic a read operation in association with the write operation suspend command.

In Example 11, the subject matter of Examples 8-14 (excluding the present Example) can optionally include in response to completion by the memory transaction control logic of the performing of the read operation issued by the controller, the controller issuing to the memory transaction control logic a write operation resume command and initiating the transferring of read data of the read operation from the memory so that concurrently with at least a portion of the read data transferring from the memory, the memory transaction control logic initiates a resumption of the write operation in response to the write operation resume command issued by the controller.

In Example 12, the subject matter of Examples 8-14 (excluding the present Example) can optionally include wherein the command received by the memory transaction control logic while performing the write operation is a read command, wherein the memory transaction control logic automatically suspends the performing of the write operation in response to receipt of the read command by the memory transaction control logic.

In Example 13, the subject matter of Examples 8-14 (excluding the present Example) can optionally include issuing by the controller to the memory transaction control logic, a read command for the read operation, in response to completion by the memory transaction control logic of the performing of the read operation for the read command issued by the controller, the memory transaction control logic automatically resuming the write operation, and in response to completion by the memory transaction control logic of the performing of the read operation for the read command issued by the controller, the controller transferring read data of the read operation from the memory so that concurrently with at least a portion of the read data transferring from the memory, the memory transaction control logic resumes the write operation.

In Example 14, the subject matter of Examples 8-14 (excluding the present Example) can optionally include at least one of: displaying by a display communicatively coupled to a processor, interfacing with a network by a network interface communicatively coupled to the processor, or powering a system including the non-volatile memory interface by a battery coupled to provide power to the system.

Example 15 is an apparatus comprising means to perform a method as claimed in any preceding claim.

Example 16 is a system, comprising: a central processing unit, a non-volatile memory including an array of bit cells, and a non-volatile memory interface for the central processing unit and the array of bit cells, wherein the central processing unit is configured to generate and transmit to the non-volatile memory interface, a memory transaction request and a system address at which the memory transaction is to take place, and wherein the non-volatile memory interface includes: write operation logic configured to receive a write command and to perform a write operation in response to a received write command, write operation suspend logic configured to receive a command, and to suspend a write operation in response to the command received by the write operation suspend logic, read operation logic configured to receive a read command and to perform a read operation in response to a received read command, and data transfer logic configured to transfer read data of the read operation from the memory, wherein the write operation suspend logic is further configured to resume a suspended write operation concurrently with at least a portion of the transfer of read data from the memory.

In Example 17, the subject matter of Examples 16-22 (excluding the present Example) can optionally include wherein a memory transaction request from the central processing unit is a memory read transaction request and wherein the non-volatile memory interface includes a controller having memory command issuance logic configured to, in response to a memory read transaction request from the central processing unit, issue a write operation suspend command to the write operation suspend logic of the non-volatile memory interface and wherein the command received by the write operation suspend logic is the write operation suspend command to cause the write operation suspend logic to suspend a write operation in response to the write operation suspend command received by the write operation suspend logic.

In Example 18, the subject matter of Examples 16-22 (excluding the present Example) can optionally include wherein the memory command issuance logic is further configured to, in response to the memory read transaction request from the central processing unit, issue to the read operation logic a read command in association with issuance of a write operation suspend command.

In Example 19, the subject matter of Examples 16-22 (excluding the present Example) can optionally include wherein the controller includes the data transfer logic which is further configured to, in response to completion of a read operation, to transfer read data of the completed read operation from the memory, and wherein the memory command issuance logic is further configured to, in response to completion of a read operation, issue to the write operation suspend logic a write operation resume command to initiate resumption of a previously suspended write operation command so that the data transfer logic is configured to transfer at least a portion of the read data from the memory concurrently with resumption of a write operation in response to the write operation resume command issued by the memory command issuance logic.

In Example 20, the subject matter of Examples 16-22 (excluding the present Example) can optionally include wherein a memory transaction request from the central processing unit is a memory read transaction request, wherein the non-volatile memory interface includes a controller having memory command issuance logic configured to, in response to the memory read transaction request from the central processing unit, issue to the write operation suspend logic a read command so that the command received by the write operation suspend logic is a read command, and wherein the write operation suspend logic is configured to automatically suspend performing of a write operation in response to receipt of a read command by the write operation suspend logic.

In Example 21, the subject matter of Examples 16-22 (excluding the present Example) can optionally include wherein the write operation suspend logic is further configured to automatically resume a previously suspended write operation in response to completion of a read operation by the read operation logic, and wherein the controller includes the data transfer logic which is further configured to, in response to completion of a read operation, to transfer read data of the completed read operation from the memory, so that the data transfer logic is configured to transfer at least a portion of the read data from the memory concurrently with resumption of a write operation in response to completion of a read operation.

In Example 22, the subject matter of Examples 16-22 (excluding the present Example) can optionally include at least one of: a display communicatively coupled to the central processing unit, a network interface communicatively coupled to the central processing unit, and a battery coupled to provide power to the system.

Example 23 is an apparatus for a non-volatile memory, comprising: a non-volatile memory interface including: write operation logic means for receiving a write command and for performing a write operation in response to a received write command, write operation suspend logic means for receiving a command, and for suspending a write operation in response to the command received by the write operation suspend logic means, read operation logic means for receiving a read command and for performing a read operation in response to a received read command, and data transfer logic means for transferring read data of the read operation from the memory, wherein the write operation suspend logic means is further configured to resume a suspended write operation concurrently with at least a portion of the transfer of read data from the memory.

In Example 24, the subject matter of Examples 23-29 (excluding the present Example) can optionally include wherein the non-volatile memory interface includes a controller having memory command issuance logic means for issuing a write operation suspend command to the write operation suspend logic means of the non-volatile memory interface and wherein the command received by the write operation suspend logic means is the write operation suspend command to cause the write operation suspend logic means to suspend a write operation in response to the write operation suspend command received by the write operation suspend logic means.

In Example 25, the subject matter of Examples 23-29 (excluding the present Example) can optionally include wherein the memory command issuance logic means is further configured to issue to the read operation logic means a read command in association with issuance of a write operation suspend command.

In Example 26, the subject matter of Examples 23-29 (excluding the present Example) can optionally include wherein the controller includes the data transfer logic means which is further configured to, in response to completion of a read operation, to transfer read data of the completed read operation from the memory, and wherein the memory command issuance logic means is further configured to issue to the write operation suspend logic means a write operation resume command to initiate resumption of a previously suspended write operation command so that the data transfer logic means is configured to transfer at least a portion of the read data from the memory concurrently with resumption of a write operation in response to the write operation resume command issued by the memory command issuance logic means.

In Example 27, the subject matter of Examples 23-29 (excluding the present Example) can optionally include wherein the command received by the write operation suspend logic means is a read command, wherein the write operation suspend logic means is further configured to automatically suspend performing of a write operation in response to receipt of a read command by the write operation suspend logic means.

In Example 28, the subject matter of Examples 23-29 (excluding the present Example) can optionally include wherein the non-volatile memory interface includes a controller having memory command issuance logic means for issuing a read command, wherein the write operation suspend logic means is further configured to automatically resume a previously suspended write operation in response to completion of a read operation by the read operation logic means, and wherein the controller includes the data transfer logic means which is further configured to, in response to completion of a read operation, to transfer read data of the completed read operation from the memory, so that the data transfer logic means is configured to transfer at least a portion of the read data from the memory concurrently with resumption of a write operation in response to completion of a read operation.

In Example 29, the subject matter of Examples 23-29 (excluding the present Example) can optionally include a computing system comprising: said non-volatile memory interface, a processor configured to generate and transmit to the non-volatile memory interface, a memory transaction request and a system address at which the memory transaction is to take place, and any of: a display communicatively coupled to the processor, a network interface communicatively coupled to the processor, or a battery coupled to provide power to the system.

Example 30 is a computer program product for a computing system wherein the computer program product comprises a computer readable storage medium having program instructions embodied therewith, the program instructions executable by a processor of the computing system to cause operations, the operations comprising: performing by a memory transaction control logic, a write operation in a non-volatile memory in response to a write command received by the memory transaction control logic, receiving by the memory transaction control logic, a command while performing the write operation, in response to the received command, suspending by the memory transaction control logic, the performing of the write operation, performing by the memory transaction control logic, a read operation while the write operation is suspended, transferring by a controller, read data of the read operation from the memory, and concurrently with at least a portion of the read data transferring from the memory, resuming by the memory transaction control logic, the performing of the write operation.

In Example 31, the subject matter of Examples 30-36 (excluding the present Example) can optionally include wherein the operations further comprise a controller issuing a write operation suspend command to the memory transaction control logic wherein the command received by the memory transaction control logic while performing the write operation is the write operation suspend command issued by the controller so that in response to the received write operation suspend command, the memory transaction control logic suspends the performing of the write operation.

In Example 33, the subject matter of Examples 30-36 (excluding the present Example) can optionally include wherein the operations further comprise the controller issuing to the memory transaction control logic a read operation in association with the write operation suspend command.

In Example 33, the subject matter of Examples 30-36 (excluding the present Example) can optionally include wherein the operations further comprise in response to completion by the memory transaction control logic of the performing of the read operation issued by the controller, the controller issuing to the memory transaction control logic a write operation resume command and initiating the transferring of read data of the read operation from the memory so that concurrently with at least a portion of the read data transferring from the memory, the memory transaction control logic initiates a resumption of the write operation in response to the write operation resume command issued by the controller.

In Example 34, the subject matter of Examples 30-36 (excluding the present Example) can optionally include wherein the command received by the memory transaction control logic while performing the write operation is a read command, wherein the memory transaction control logic automatically suspends the performing of the write operation in response to receipt of the read command by the memory transaction control logic.

In Example 35, the subject matter of Examples 30-36 (excluding the present Example) can optionally include wherein the operations further comprise: issuing by the controller to the memory transaction control logic, a read command for the read operation, in response to completion by the memory transaction control logic of the performing of the read operation for the read command issued by the controller, the memory transaction control logic automatically resuming the write operation, and in response to completion by the memory transaction control logic of the performing of the read operation for the read command issued by the controller, the controller transferring read data of the read operation from the memory so that concurrently with at least a portion of the read data transferring from the memory, the memory transaction control logic resumes the write operation.

In Example 36, the subject matter of Examples 30-36 (excluding the present Example) can optionally include wherein the operations further comprise at least one of: displaying by a display communicatively coupled to a processor, interfacing with a network by a network interface communicatively coupled to the processor, or powering a system including the non-volatile memory interface by a battery coupled to provide power to the system.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus for a non-volatile memory, comprising: a non-volatile memory interface including:
   write operation logic configured to receive a write command and to perform a write operation in response to a received write command;
   write operation suspend logic configured to receive a command, and to suspend a write operation in response to the command received by the write operation suspend logic;
   read operation logic configured to receive a read command and to perform a read operation in response to a received read command; and
   data transfer logic configured to transfer read data of the read operation from the memory;
   wherein the write operation suspend logic is further configured to resume a suspended write operation concurrently with at least a portion of the transfer of read data from the memory.

2. The apparatus of claim 1 wherein the non-volatile memory interface includes a controller having memory command issuance logic configured to issue a write operation suspend command to the write operation suspend logic of the non-volatile memory interface and wherein the command received by the write operation suspend logic is the write operation suspend command to cause the write operation suspend logic to suspend a write operation in response to the write operation suspend command received by the write operation suspend logic.

3. The apparatus of claim 2 wherein the memory command issuance logic is further configured to issue to the read operation logic a read command in association with issuance of a write operation suspend command.

4. The apparatus of claim 3 wherein the controller includes the data transfer logic which is further configured to, in response to completion of a read operation, to transfer read data of the completed read operation from the memory, and wherein the memory command issuance logic is further configured to issue to the write operation suspend logic a write operation resume command to initiate resumption of a previously suspended write operation command so that the data transfer logic is configured to transfer at least a portion of the read data from the memory concurrently with resumption of a write operation in response to the write operation resume command issued by the memory command issuance logic.

5. The apparatus of claim 1 wherein the command received by the write operation suspend logic is a read command, wherein the write operation suspend logic is configured to automatically suspend performing of a write operation in response to receipt of a read command by the write operation suspend logic.

6. The apparatus of claim 5 wherein the non-volatile memory interface includes a controller having memory command issuance logic configured to issue a read command, wherein the write operation suspend logic is further configured to automatically resume a previously suspended write operation in response to completion of a read operation by the read operation logic, and wherein the controller includes the data transfer logic which is further configured to, in response to completion of a read operation, to transfer read data of the completed read operation from the memory, so that the data transfer logic is configured to transfer at least a portion of the read data from the memory concurrently with resumption of a write operation in response to completion of a read operation.

7. A method, comprising:
performing by a memory transaction control logic, a write operation in a non-volatile memory in response to a write command received by the memory transaction control logic;
receiving by the memory transaction control logic, a command while performing the write operation;
in response to the received command, suspending by the memory transaction control logic, the performing of the write operation;
performing by the memory transaction control logic, a read operation while the write operation is suspended;
transferring by a controller, read data of the read operation from the memory; and
concurrently with at least a portion of the read data transferring from the memory, resuming by the memory transaction control logic, the performing of the write operation.

8. The method of claim 7 further comprising a controller issuing a write operation suspend command to the memory transaction control logic wherein the command received by the memory transaction control logic while performing the write operation is the write operation suspend command issued by the controller so that in response to the received write operation suspend command, the memory transaction control logic suspends the performing of the write operation.

9. The method of claim 7 further comprising the controller issuing to the memory transaction control logic a read operation in association with the write operation suspend command.

10. The method of claim 9 further comprising in response to completion by the memory transaction control logic of the performing of the read operation issued by the controller, the controller issuing to the memory transaction control logic a write operation resume command and initiating the transferring of read data of the read operation from the memory so that concurrently with at least a portion of the read data transferring from the memory, the memory transaction control logic initiates a resumption of the write operation in response to the write operation resume command issued by the controller.

11. The method of claim 7 wherein the command received by the memory transaction control logic while performing the write operation is a read command, wherein the memory transaction control logic automatically suspends the performing of the write operation in response to receipt of the read command by the memory transaction control logic.

12. The method of claim 7 further comprising:
issuing by the controller to the memory transaction control logic, a read command for the read operation;
in response to completion by the memory transaction control logic of the performing of the read operation for the read command issued by the controller, the memory transaction control logic automatically resuming the write operation; and
in response to completion by the memory transaction control logic of the performing of the read operation for the read command issued by the controller, the controller transferring read data of the read operation from the memory so that concurrently with at least a portion of the read data transferring from the memory, the memory transaction control logic resumes the write operation.

13. A system, comprising:
a central processing unit;
a non-volatile memory including an array of bit cells; and
a non-volatile memory interface for the central processing unit and the array of bit cells;
wherein the central processing unit is configured to generate and transmit to the non-volatile memory interface, a memory transaction request and a system address at which the memory transaction is to take place;
and wherein the non-volatile memory interface includes:
write operation logic configured to receive a write command and to perform a write operation in response to a received write command;
write operation suspend logic configured to receive a command, and to suspend a write operation in response to the command received by the write operation suspend logic;
read operation logic configured to receive a read command and to perform a read operation in response to a received read command; and
data transfer logic configured to transfer read data of the read operation from the memory;
wherein the write operation suspend logic is further configured to resume a suspended write operation concurrently with at least a portion of the transfer of read data from the memory.

14. The system of claim 13 wherein a memory transaction request from the central processing unit is a memory read transaction request and wherein the non-volatile memory interface includes a controller having memory command issuance logic configured to, in response to a memory read transaction request from the central processing unit, issue a write operation suspend command to the write operation suspend logic of the non-volatile memory interface and wherein the command received by the write operation suspend logic is the write operation suspend command to cause the write operation suspend logic to suspend a write operation in response to the write operation suspend command received by the write operation suspend logic.

15. The system of claim 14 wherein the memory command issuance logic is further configured to, in response to the memory read transaction request from the central processing unit, issue to the read operation logic a read command in association with issuance of a write operation suspend command.

16. The system of claim 15 wherein the controller includes the data transfer logic which is further configured to, in response to completion of a read operation, to transfer read data of the completed read operation from the memory, and wherein the memory command issuance logic is further configured to, in response to completion of a read operation, issue to the write operation suspend logic a write operation resume command to initiate resumption of a previously suspended write operation command so that the data transfer logic is configured to transfer at least a portion of the read data from the memory concurrently with resumption of a write operation in response to the write operation resume command issued by the memory command issuance logic.

17. The system of claim 13 wherein a memory transaction request from the central processing unit is a memory read transaction request, wherein the non-volatile memory interface includes a controller having memory command issuance logic configured to, in response to the memory read transaction request from the central processing unit, issue to the write operation suspend logic a read command so that the command received by the write operation suspend logic is a read command, and wherein the write operation suspend logic is configured to automatically suspend performing of a write operation in response to receipt of a read command by the write operation suspend logic.

18. The system of claim 17 wherein the write operation suspend logic is further configured to automatically resume a previously suspended write operation in response to completion of a read operation by the read operation logic, and wherein the controller includes the data transfer logic which is further configured to, in response to completion of a read operation, to transfer read data of the completed read operation from the memory, so that the data transfer logic is configured to transfer at least a portion of the read data from the memory concurrently with resumption of a write operation in response to completion of a read operation.

19. The system of claim 13 further comprising at least one of:
   a display communicatively coupled to the central processing unit, a network interface communicatively coupled to the central processing unit, and a battery coupled to provide power to the system.

\* \* \* \* \*